US012754641B2

(12) United States Patent
Li et al.

(10) Patent No.: US 12,754,641 B2
(45) Date of Patent: Oct. 6, 2026

(54) ELECTRONIC DEVICE AND INFRARED TOUCH FRAME HAVING RADIO FREQUENCY SIGNAL PROCESSING FUNCTION

(71) Applicant: SHENZHEN KTC COMMERCIAL DISPLAY TECHNOLOGY CO., LTD., Shenzhen (CN)

(72) Inventors: Zhenle Li, Shenzhen (CN); Xudong Li, Shenzhen (CN); Changqing Wei, Shenzhen (CN)

(73) Assignee: SHENZHEN KTC COMMERCIAL DISPLAY TECHNOLOGY CO., LTD., Shenzhen (CN)

( * ) Notice: Subject to any disclaimer, the term of this patent is extended or adjusted under 35 U.S.C. 154(b) by 96 days.

(21) Appl. No.: 18/879,750

(22) PCT Filed: Aug. 5, 2022

(86) PCT No.: PCT/CN2022/110396
§ 371 (c)(1),
(2) Date: Dec. 28, 2024

(87) PCT Pub. No.: WO2024/007408
PCT Pub. Date: Jan. 11, 2024

(65) Prior Publication Data
US 2026/0178151 A1 Jun. 25, 2026

(30) Foreign Application Priority Data
Jul. 6, 2022 (CN) ........................ 202210846988.8

(51) Int. Cl.
*G06F 3/042* (2006.01)

(52) U.S. Cl.
CPC .................................. *G06F 3/0428* (2013.01)

(58) Field of Classification Search
None
See application file for complete search history.

(56) References Cited

U.S. PATENT DOCUMENTS

2005/0243070 A1* 11/2005 Ung ...................... G06F 3/0421 345/176
2013/0033437 A1 2/2013 Lee et al.
(Continued)

FOREIGN PATENT DOCUMENTS

CN 206097084 U 4/2017
CN 206209631 U 5/2017
(Continued)

OTHER PUBLICATIONS

International Search Report of PCT Patent Application No. PCT/CN2022/110396 issued on Dec. 5, 2022.

*Primary Examiner* — Christopher J Kohlman

(57) ABSTRACT

An electronic device and an infrared touch frame (1) having a radio frequency signal processing function. An accommodation space is formed at least by the infrared touch frame (1); a circuit board (13), an infrared light element (131), and a radio frequency signal element (14) are provided in the accommodation space; the circuit board (13) is electrically connected to the infrared light element (131) and the radio frequency signal element (14), respectively; the side of the infrared touch frame (1) close to a display device main body (2) is provided with a filter strip (12); an infrared signal of the infrared light element (131) and a radio frequency signal of the radio frequency signal element (14) both penetrate through the filter strip (12) for transmission, so that the transmission efficiency of the radio frequency signal can be improved.

20 Claims, 5 Drawing Sheets

(56) References Cited

U.S. PATENT DOCUMENTS

| | | | | |
|---|---|---|---|---|
| 2022/0276734 | A1* | 9/2022 | Fu | G06F 1/1643 |
| 2022/0291766 | A1* | 9/2022 | Wang | G06F 3/046 |
| 2024/0036384 | A1* | 2/2024 | Huang | G02F 1/13338 |

FOREIGN PATENT DOCUMENTS

| | | | |
|---|---|---|---|
| CN | 208834285 | U | 5/2019 |
| CN | 211180793 | U | 8/2020 |
| CN | 216748702 | U | 6/2022 |

* cited by examiner

ELECTRONIC DEVICE AND INFRARED TOUCH FRAME HAVING RADIO FREQUENCY SIGNAL PROCESSING FUNCTION

The present application is based on the Chinese patent application 202210846988.8, filed on Jul. 6, 2022, and claims priority of the Chinese Patent Application, the entire contents of which are hereby incorporated as a whole by reference herein.

TECHNICAL FIELD

The present application relates to the technical field of electronic devices, in particular to an electronic device and an infrared touch frame having a radio frequency signal processing function.

BACKGROUND ART

A touch display terminal, an electronic whiteboard and a touch panel are widely applied to production and life. On the basis of a traditional touch function, a user can also use a writing pen to input corresponding operation information, during a specific operation, the writing pen can detect a pressure value of a user' operation on a display screen of a main device and transmit the pressure value to the main device. However, an existing technical method is to splice a receiver, as an external device, of the writing pen to the main device, receive pressure value information of the writing pen through the receiver, and output the pressure value information to the main device. However, the receiver of the writing pen in such a traditional technical method is independent, will occupy an external space of the main device during use, and is easy to lose so as to be very inconvenient to use. Therefore, the receiver of the writing pen in the existing technical method is inconvenient to use.

SUMMARY OF THE INVENTION

Embodiments of the present application provide an electronic device and an infrared touch frame having a radio frequency signal processing function to solve the problem that the receiver of the writing pen in the existing technical method is inconvenient to use.

On one hand, an embodiment of the present application provides an infrared touch frame having a radio frequency signal processing function, the infrared touch frame being provided on edges of a display device main body, wherein a side, close to the display device main body, of the infrared touch frame is provided with a filter strip;

an accommodation space is formed at least by the infrared touch frame;

a circuit board, an infrared light element, and a radio frequency signal element are provided in the accommodation space; the circuit board is electrically connected to the infrared light element and the radio frequency signal element, respectively; and an infrared signal of the infrared light element and a radio frequency signal of the radio frequency signal element both penetrate through the filter strip for transmission.

According to the infrared touch frame having the radio frequency signal processing function, wherein transformation information of the radio frequency signal includes pressure sensing information.

According to the infrared touch frame having the radio frequency signal processing function, wherein the radio frequency signal element includes a radio frequency IC (Integrated Circuit) and a radio frequency antenna, and the radio frequency antenna is provided on an edge of the filter strip.

According to the infrared touch frame having the radio frequency signal processing function, wherein the radio frequency signal element further includes a power increase module; and the radio frequency IC is connected to the radio frequency antenna through the power increase module.

According to the infrared touch frame having the radio frequency signal processing function, wherein the radio frequency signal element is independently provided outside the circuit board and is electrically connected to a component on the circuit board through an external wire.

According to the infrared touch frame having the radio frequency signal processing function, wherein the radio frequency signal element is integrated on the circuit board and is electrically connected to a component on the circuit board through a conducting wire on the circuit board.

According to the infrared touch frame having the radio frequency signal processing function, wherein the circuit board is parallel to a display screen of the display device main body.

According to the infrared touch frame having the radio frequency signal processing function, wherein the circuit board is vertical to a display screen of the display device main body.

On the other hand, an embodiment of the present application further provides an electronic device, a user using a writing pen to perform an operation on a display screen of the electronic device, wherein the electronic device includes a display device main body and the infrared touch frame having the radio frequency signal processing function according to the above-mentioned first aspect;

the infrared light element detects infrared detection information that the writing pen blocks an infrared signal to obtain the infrared detection information and transmit the infrared detection information to the circuit board; and the writing pen communicates with the radio frequency signal element through a radio frequency signal.

According to the electronic device, wherein the circuit board acquires the current touch information of the writing pen in real time according to the infrared detection information and the radio frequency signal, wherein the touch information includes a touch position and a touch pressure of the writing pen.

Embodiments of the present application provide an electronic device and an infrared touch frame having a radio frequency signal processing function. The infrared touch frame is provided on edges of a display device main body; an accommodation space is formed at least by the infrared touch frame; a circuit board, an infrared light element, and a radio frequency signal element are provided in the accommodation space; the circuit board is electrically connected to the infrared light element and the radio frequency signal element, respectively; a side, close to the display device main body, of the infrared touch frame is provided with a filter strip; and an infrared signal of the infrared light element and a radio frequency signal of the radio frequency signal element both penetrate through the filter strip for transmission. According to the above-mentioned infrared touch frame, the radio frequency signal element is integrated in the infrared touch frame, and both the infrared signal and the radio frequency signal penetrate through the filter strip for transmission, so that the external space of the device can be saved, the loss of a receiver is avoided, and it is convenient for a user to use; moreover, the radio frequency signal directly penetrates through the filter strip, so that the transmission efficiency of the radio frequency signal can be improved.

BRIEF DESCRIPTION OF THE DRAWINGS

In order to describe the technical solutions in the embodiments of the present application more clearly, the accompanying drawings required for describing the embodiments will be briefly introduced below. Obviously, the accompanying drawings in the following description show only some embodiments of the present application, and those of ordinary skill in the art can still derive other accompanying drawings from these accompanying drawings without creative work.

DETAILED DESCRIPTION OF THE INVENTION

Figure 1:
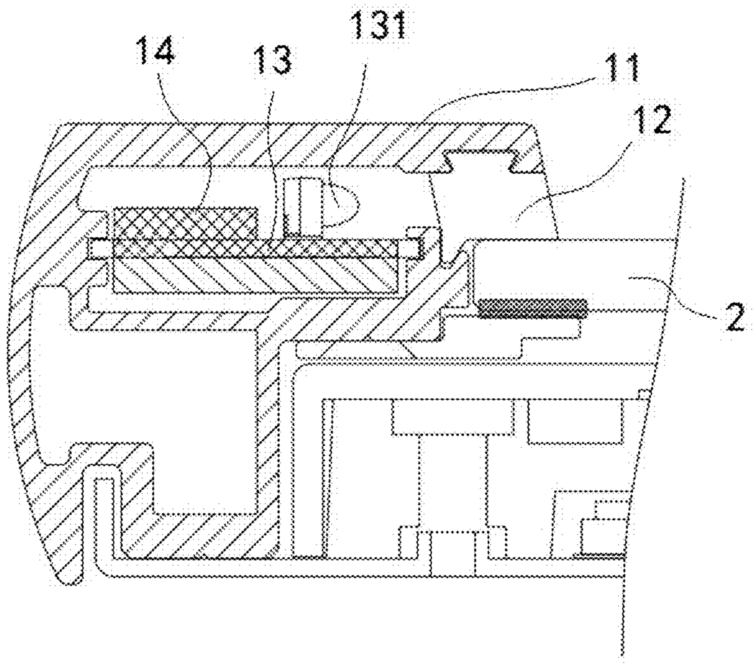
FIG. 1 is a sectional structural diagram of an infrared touch frame with a radio frequency signal processing function provided in an embodiment of the present application.

Technical solutions in the embodiments of the present application will be described clearly and completely below in conjunction with the accompanying drawings in the embodiments of the present application. Obviously, the described embodiments are only a part of the embodiments of the present application, not all the embodiments. Based on the embodiments in the present application, all other embodiments obtained by those of ordinary skill in the art without creative work shall fall within the protection scope of the present application.

It should be understood that when used in the present description and the appended claims, terms "include" and "contain" indicate the existence of described features, entireties, operations, elements and/or components, but do not exclude the existence or addition of one or more other features, entireties, operations, elements, components and/or sets thereof.

It should be further understood that the terms used in the description of the present application are only intended to describe specific embodiments, rather than to limit the present application. As used in the description and the appended claims of the present application, a singular form "one", "a" or "the" is intended to include a plural form unless other situations are clearly indicated in the context.

It should be further understood that the term "and/or" used in the description and the appended claims of the present application refers to one or any combination or all combinations of related listed items and includes these combinations.

In the present embodiment, refer to FIG. 1 to FIG. 10, as shown in the figures, an embodiment of the present application provides an infrared touch frame 1 having a radio frequency signal processing function, the infrared touch frame 1 is assembled on edges of a display device main body 2, the display device main body 2 is a device including a display screen, wherein a side, close to the display device main body 2, of the infrared touch frame 1 is provided with a filter strip 12; an accommodation space is formed at least by the infrared touch frame 1; a circuit board 13, an infrared light element 131, and a radio frequency signal element 14 are provided in the accommodation space; the circuit board 13 is electrically connected to the infrared light element 131 and the radio frequency signal element 14, respectively; and an infrared signal of the infrared light element 131 and a radio frequency signal of the radio frequency signal element 14 both penetrate through the filter strip 12 for transmission.

A common infrared touch frame 1 is of a four-side infrared structure, that is, each of four infrared side frames is provided with the infrared light element. However, the present solution can also be applied to a single-side infrared touch frame or a double-side infrared touch frame, which is not specifically limited in the present application.

Figure 2:
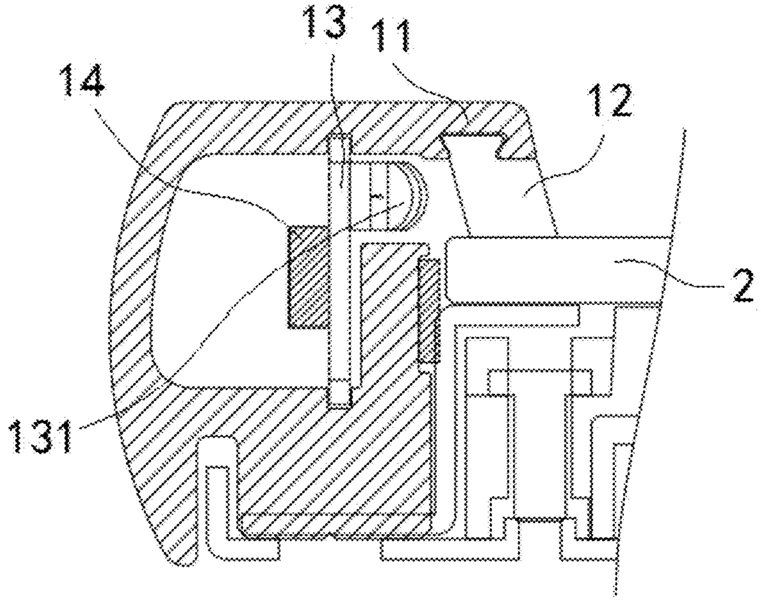
FIG. 2 is another sectional structural diagram of an infrared touch frame with a radio frequency signal processing function provided in an embodiment of the present application.
Figure 3:
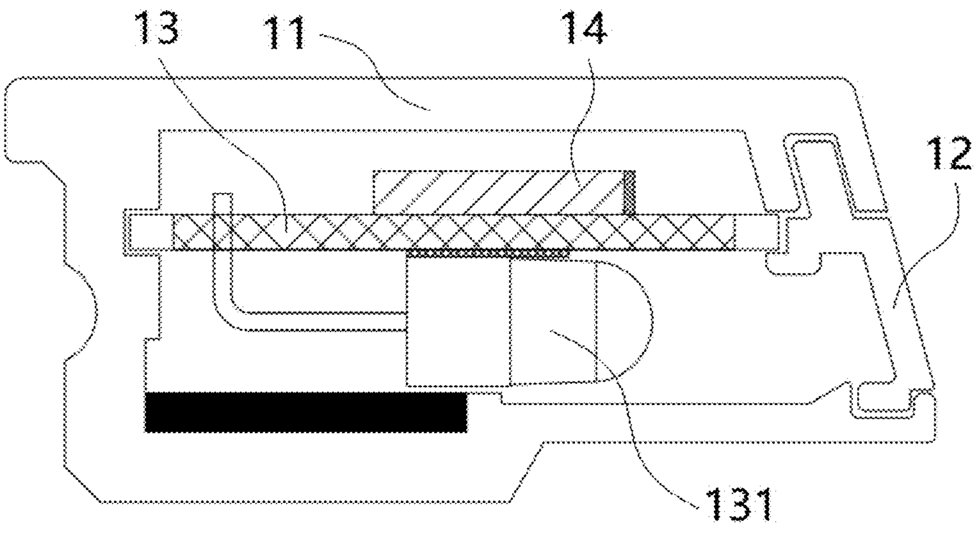
FIG. 3 is a further sectional structural diagram of an infrared touch frame with a radio frequency signal processing function provided in an embodiment of the present application.

The filter strip 12 is provided above edges, close to the display device main body 2, of the infrared touch frame 1. Specifically, the filter strip 12 can be independently provided on the infrared touch frame 1, as shown in FIG. 3; or, the filter strip can be provided between the infrared touch frame 1 and the display device main body 2, as shown in FIG. 1 or FIG. 2. A specific position of the filter strip is not limited.

The accommodation space formed at least by the infrared touch frame 1 can be an accommodation space formed alone by the infrared touch frame 1, as shown in FIG. 3; and can also be enclosed by the infrared touch frame and the display device main body, as shown in FIG. 2. A specific formation way is not limited in the present solution.

In a specific structure, as shown in FIG. 1, the infrared touch frame 1 includes a side frame main body 11 and a filter strip 12 provided between the side frame main body 11 and the display device main body 2. The infrared light element 131 can be directly aligned or not directly aligned with the filter strip 12; wherein the infrared light element 131 is directly aligned with the filter strip 12, and thus, infrared rays emitted by an infrared emitter in the infrared light element 131 directly penetrate through the filter strip 12 for transmission; and the infrared light element 131 can also not be directly aligned to the filter strip 12, for example, a light reflector is provided to reflect the infrared rays emitted by the infrared light element 131, and the reflected infrared rays penetrate through the filter strip 12 for transmission.

Figure 10:
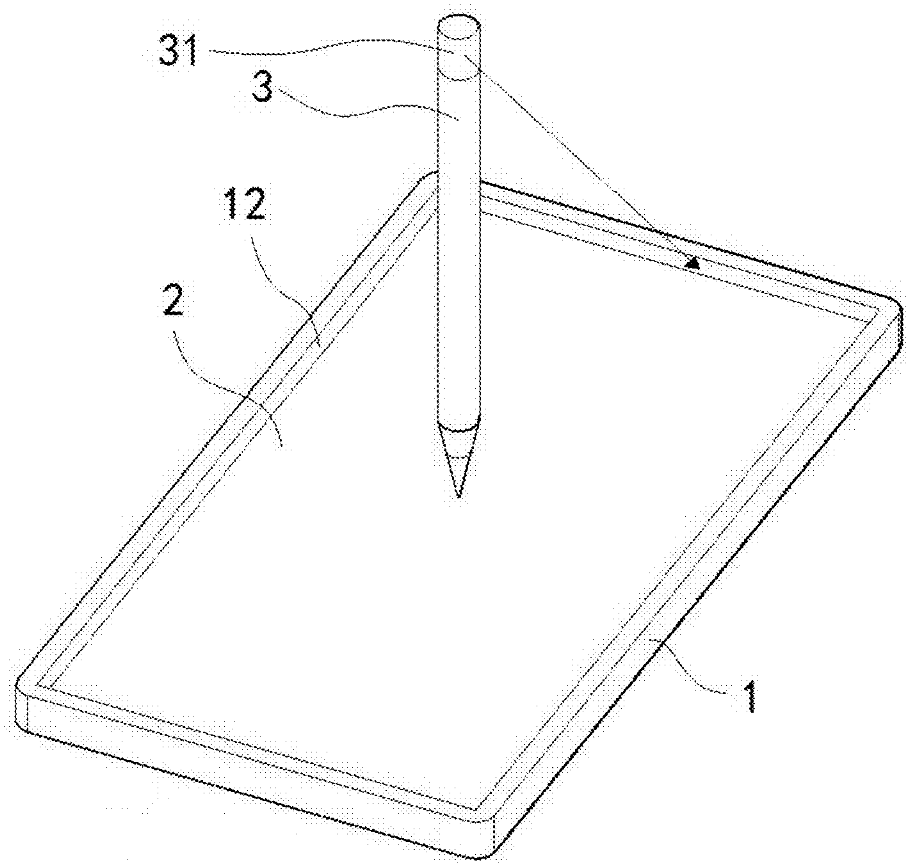
FIG. 10 is a use effect diagram of an electronic device provided in an embodiment of the present application.

The radio frequency signal element 14 is integrated in the infrared touch frame 1 of the present application, and the radio frequency signal element 14 can be a component for emitting and receiving a 2.4G radio frequency signal. Correspondingly, as shown in FIG. 1 and FIG. 10, a radio frequency module 31 for emitting and receiving the 2.4G radio frequency signal can be provided on the writing pen 3. The radio frequency signal element 14 is electrically connected to the circuit board 13, for example, the radio frequency signal element 14 is electrically connected to a processing unit (such as an MCU chip) in the radio frequency signal element 14 through a serial port. A pen point of the writing pen is in contact with a pressure sensor, and when a deformation pressure acts on the pen point of the writing pen, the pen point transfers the pressure to the pressure sensor, and thus, a resistance value of the pressure sensor will correspondingly change; and a master control chip in the writing pen collects a voltage of the pressure sensor through an ADC, for example, a voltage value is increased with the increase of the pressure of the pen point, which is then converted to obtain a pressure value, the master control chip converts a pressure value into a radio frequency signal through the radio frequency module and sends the radio frequency signal to the radio frequency signal element 14 in a wireless transmission way, and thus, transmission information of the radio frequency signal includes pressure sensing information of the writing pen. Similarly, the radio frequency signal element 14 can send the radio frequency signal to the writing pen in the wireless transmission way.

Figure 8:
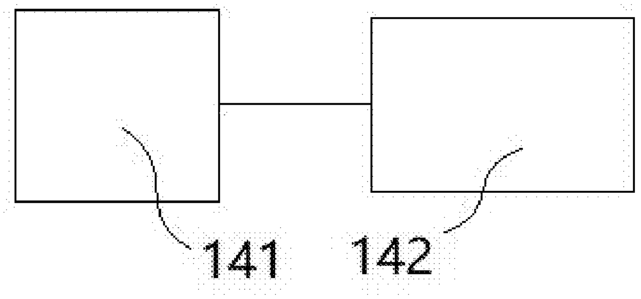
FIG. 8 is a structural diagram of a radio frequency signal element provided in an embodiment of the present application.

In a specific embodiment, the radio frequency signal element 14 includes a radio frequency IC 141 and a radio frequency antenna 142, and the radio frequency antenna 142 is provided on an edge of the filter strip 12. In order to improve the transmission efficiency of the radio frequency signal, the radio frequency antenna 142 can be close to the edge of the filter strip 12, for example, a spacing between the radio frequency antenna 142 and the filter strip 12 is set to be 0-2 cm. The radio frequency IC and the radio frequency antenna are coplanar or non-coplanar. A structure of the radio frequency signal element 14 is shown in FIG. 8.

Figure 9:
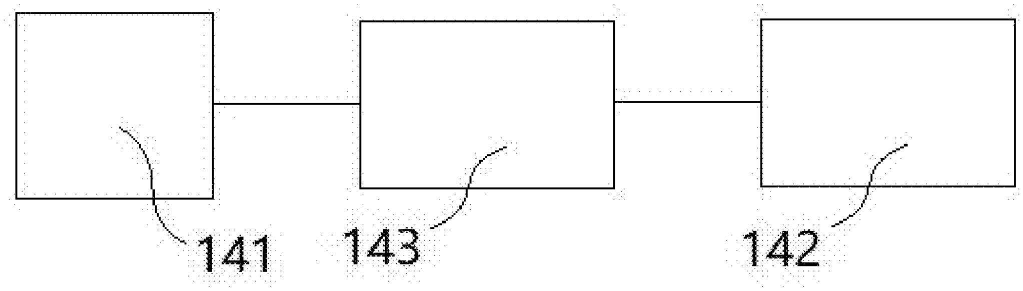
FIG. 9 is another structural diagram of a radio frequency signal element provided in an embodiment of the present application.

The radio frequency antenna 142 of the radio frequency signal element 14 can also be provided on any position in the accommodation space, wherein the radio frequency signal element 14 further includes a power increase module 143, and the radio frequency IC 141 is connected to the radio frequency antenna 142 through the power increase module 143. For example, the radio frequency IC 141 is used for sending a radio frequency signal to be outputted to the power increase module 143, the power increase module 143 is used for enhancing the power of the radio frequency signal to obtain a radio frequency amplification signal, and the radio frequency amplification signal can be sent to the writing pen through the radio frequency antenna 142. For example, in the embodiment of the present application, a radio frequency driving amplifier AH102 is used as the radio frequency module. A structure of the radio frequency signal element 14 is shown in FIG. 9.

The infrared light element 131 consists of an infrared emitter and an infrared receiver. An infrared signal is emitted by the infrared emitter of the infrared light element 131, infrared rays cover an upper layer of the display screen, and in the case that there is no shield, the infrared receiver provided on one side wall opposite to the infrared emitter can receive infrared rays emitted by the infrared emitter; and when a user uses the writing pen to perform an operation on the display screen of the display device main body 2, the writing pen shields the infrared rays on the upper layer of the display screen, the infrared receiver of the infrared light element 131 detects the infrared signal shielded by the writing pen 3, and thus, infrared detection information is obtained and is transmitted to the circuit board 13.

In a more specific embodiment, the radio frequency signal element 14 is independently provided outside the circuit board 13 and is electrically connected to a component on the circuit board 13 through an external wire.

Figure 4:
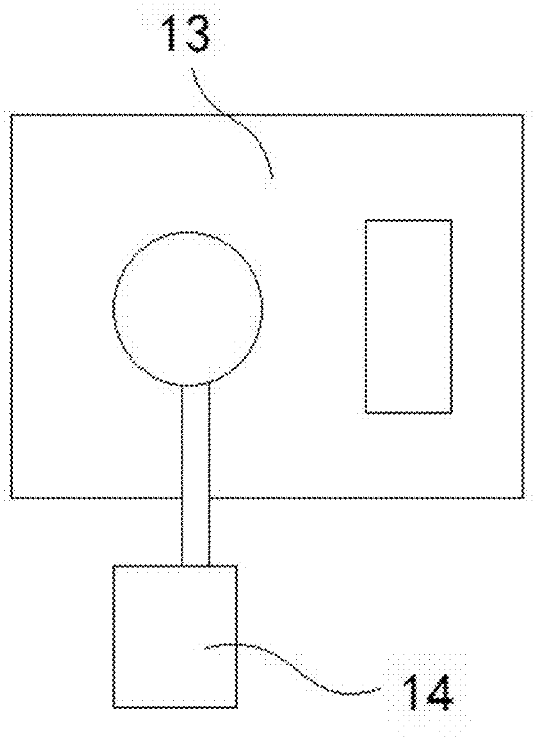
FIG. 4 is a local structural diagram of an infrared touch frame with a radio frequency signal processing function provided in an embodiment of the present application.

During a specific application, the radio frequency signal element 14 can be independently provided outside the circuit board 13, at the moment, the radio frequency signal element 14 is electrically connected to a component on the circuit board 13 through an external wire. A specific structure is shown in FIG. 4.

In a more specific embodiment, the radio frequency signal element 14 is integrated on the circuit board 13 and is electrically connected to a component on the circuit board 13 through a conducting wire on the circuit board 13.

Figure 5:
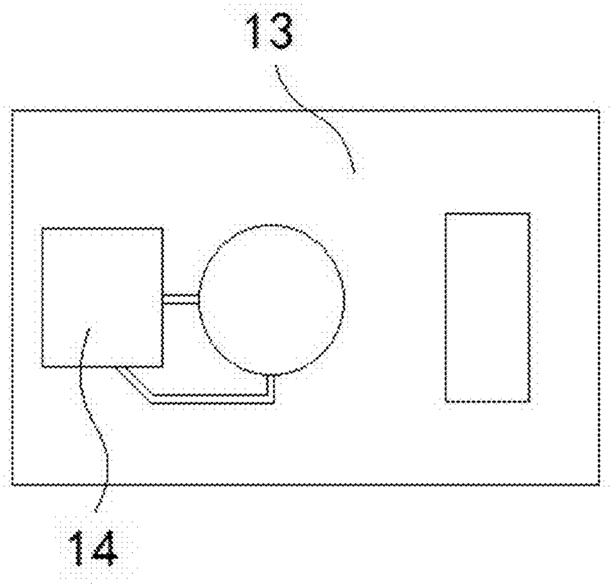
FIG. 5 is another local structural diagram of an infrared touch frame with a radio frequency signal processing function provided in an embodiment of the present application.

During another application, the radio frequency signal element 14 can be integrated on the circuit board, and a component on the circuit board is electrically connected through a conducting wire, at the moment, the radio frequency signal element 14 is electrically connected to the component on the circuit board 13 through the conducting wire, and a specific structure is shown in FIG. 5. By integrating the radio frequency signal element 14 on the circuit board, the integration level of the component in the infrared touch frame 1 can be further improved, and the structural compatibility is improved, so that the space occupied by the radio frequency signal element 14 is smaller, the sectional size of the infrared touch frame 1 is reduced, and the utilization ratio of the space in the infrared touch frame 1 is higher.

In a more specific embodiment, the circuit board 13 is parallel to a display screen of the display device main body 2, and the infrared light element 131 is provided on a top surface of the circuit board 13.

During a specific application, the circuit board 13 includes two surfaces, the circuit board 13 can be disposed in parallel to the display screen, if directions in which the infrared light element 131 emits and receives infrared rays are both parallel to the display screen, the infrared light element 131 is provided on the top surface of the circuit board 13 (a TOP layer of the circuit board 13). A specific structure is shown in FIG. 1. When the display screen is laid flat, the circuit board 13 is also in a laying-flat state; and when the display screen stands sideways, the circuit board 13 is also correspondingly in a standing-sideways state.

In a more specific embodiment, the circuit board 13 is vertical to a display screen of the display device main body 2. The infrared light element 131 is provided on a side, facing the filter strip 12, on the circuit board 13.

During a specific application, the circuit board 13 can also be disposed to be vertical to the display screen, that is, the circuit board 13 is disposed to be "vertical", and the circuit board 13 includes two surfaces; and if directions in which the infrared light element 131 emits and receives infrared rays are both parallel to the display screen, the infrared light element 131 is provided on the side, facing the filter strip 12, on the circuit board 13. A specific structure is shown in FIG. 2. When the display screen is laid flat, the circuit board 13 is in a standing-sideways state; and when the display screen stands sideways, the circuit board 13 is in a laying-flat state.

A direction in which the circuit board is provided can be adjusted according to the size of the display screen and an actual application scenario. For example, for a large-size display screen included by an electronic whiteboard, the circuit board 13 can be disposed to be "vertical"; and for a small-size display screen included by a tablet personal computer, the circuit board 13 can be disposed to be "horizontal", so that the thickness of the tablet personal computer is reduced.

Specifically, the radio frequency antenna 142 and the infrared light element 131 are provided on the same surface of the circuit board 13. Or, the radio frequency antenna 142 and the infrared light element 131 are provided on two opposite surfaces of the circuit board 13.

Figure 6:
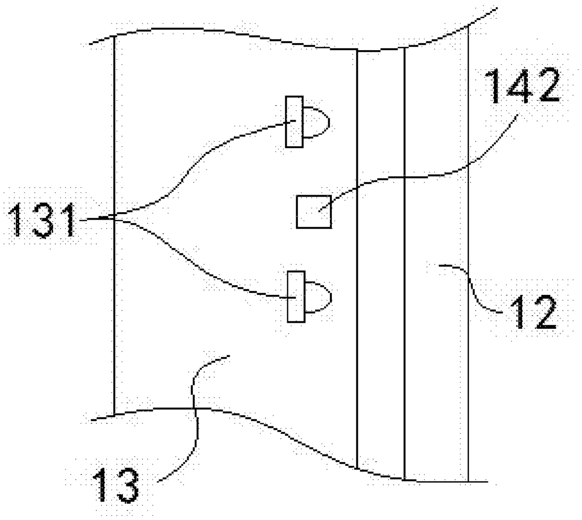
FIG. 6 is a further local structural diagram of an infrared touch frame with a radio frequency signal processing function provided in an embodiment of the present application.

Specifically, the infrared light element 131 includes a plurality of sub-elements which are infrared emitters and infrared receivers; when the infrared light element 131 and the radio frequency antenna 142 are provided on the same surface of the circuit board 13, the radio frequency antenna 142 can be provided among the sub-elements; and when the circuit board 13 is parallel to the display screen of the display device main body 2, a specific structure of the radio frequency antenna 142 is shown in FIG. 6.

Figure 7:
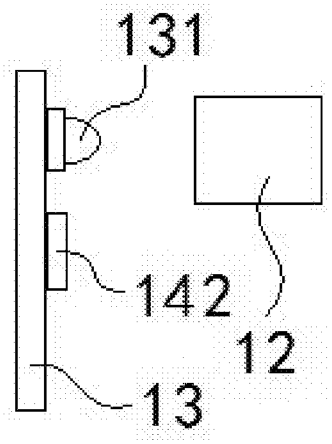
FIG. 7 is a yet further local structural diagram of an infrared touch frame with a radio frequency signal processing function provided in an embodiment of the present application.

When the infrared light element 131 and the radio frequency antenna 142 are provided on the same surface of the circuit board 13, the radio frequency antenna 142 can be provided below the sub-elements; and when the circuit board 13 is vertical to the display screen of the display device main body 2, a specific structure of the radio frequency antenna 142 is shown in FIG. 7.

When the radio frequency antenna 142 is integrated on the circuit board 13, the radio frequency antenna 142 can be provided on the same surface as the infrared light element 131, or the radio frequency antenna 142 can be provided on a different surface from the infrared light element 131. During actual applications, the way that the radio frequency antenna 142 is integrated on the circuit board 13 can be flexibly adjusted. For example, in order to further save the space occupied by the radio frequency signal element 14 and improve the integration level of the components in the infrared touch frame 1 at the same time, the radio frequency antenna 142 and the infrared light element 131 can be provided on the same surface of the circuit board 13; and an infrared signal and a radio frequency signal can be directly received by the corresponding receiver on the circuit board 13 after penetrating through the filter strip, so that the transmission efficiency of the radio frequency signal can be further improved.

As shown in FIG. 10, an embodiment of the present application further provides an electronic device, wherein the electronic device includes a display device main body 2 and the infrared touch frame 1 having the radio frequency signal processing function in the above-mentioned embodiment, and a user uses a writing pen 3 to perform an operation on a display screen of the electronic device; the infrared light element 131 detects infrared detection information that the writing pen 3 blocks an infrared signal to obtain the infrared detection information and transmit the infrared detection information to the circuit board; and the writing pen 3 communicates with the radio frequency signal element 14 through a radio frequency signal. The circuit board 13 acquires the current touch information of the writing pen 3 in real time according to the infrared detection information and the radio frequency signal, wherein the touch information includes a touch position and a touch pressure of the writing pen. Specifically, the infrared receiver of the infrared light element 131 detects the infrared signal blocked by the writing pen 3 to obtain the infrared detection information and transmit the infrared detection information to the circuit board 13, wherein the infrared signal is emitted by the infrared emitter of the infrared light element 131; pressure value information of the pen point of the writing pen 3 is detected and is transmitted to the circuit board 13 by the radio frequency signal element 14 after being converted into the radio frequency signal; the circuit board 13 acquires the current touch information of the writing pen 3 in real time according to the infrared detection information and the radio frequency signal; and the touch information includes a touch position and a touch pressure of the writing pen.

Keys can also be provided on the writing pen 3, the master control chip of the writing pen acquires key information of long-pressing/short-pressing states of the keys, the radio frequency module 31 on the writing pen 3 sends all data packets to the radio frequency signal element 14 through the radio frequency signal, at the moment, the data packets include the pressure value information and the key information.

As a feasible implementation, the master control chip of the writing pen scans the key states and acquires the key information. The writing pen mainly include two keys: KEY1 and KEY2; there are mainly six key states: the KEY1 is short-pressed, the KEY1 is long-pressed for 1.5-8 S, the KEY1 is long-pressed for 8 S or longer, the KEY2 is short-pressed, the KEY2 is long-pressed for 1.5-8 S, and the KEY2 is long-pressed for 8 S or longer. The purpose of scanning the keys is to trigger key functions in time, an interrupted scanning way is adopted, and when an IO interface corresponding to a key changes from a high level to a low level, a GPIO interface is triggered to be interrupted. Triggering time of the three states of each key is defined, and when the IO interface corresponding to the key changes from the low level to the high level, it is regarded as one-time key trigger. When a duration of the low level is less than or greater than the defined short-pressing time (less than 1.5 S) which is 1.5 S and 8 S, it is regarded as the three states that the key is short-pressed, the key is long-pressed for 1.5-8 S, and the key is long-pressed for 8 S. After the key states are acquired, the corresponding radio frequency signals are sent to the radio frequency signal element 14 according to corresponding functional requirements, so that the key functions are triggered. The achievement processes of the key functions include key vibration elimination, so that the accuracy of the keys is improved. The key functions can correspond to functions, such as page turning, sound adjustment, and picture brightness.

As a feasible implementation, the writing pen is paired with an electronic product, which can achieve a purpose that one pen is applicable to a scenario where there are a plurality of computers or a scenario where another writing pen is paired with one computer or is replaced for use. Once the pairing is successful, repairing is not needed. An achievement principle of pairing is that the radio frequency module 31 of the writing pen and the radio frequency signal element 14 are switched into a pairing mode and both use the same communication address, i.e., a broadcast address. The radio frequency module 31 is used as an emission end, and the radio frequency signal element 14 is used as a receiving end; or the radio frequency module 31 is used as the receiving end, and the radio frequency signal element 14 is used as the emission end; then, if there is a receiving end receiving a unique communication address of the emission end after the emission end sends the unique communication address, the receiving end will switch the communication address into a received address, data is sent to inform the emission end before this, then, the both are switched to the unique communication address of the emission end, in this way, one-to-one communication between the both can be achieved, and thus, a pairing function is achieved.

A communication serial port provided in the writing pen plays a role in intercommunication between the radio frequency module 31 and the radio frequency signal element 14 in the circuit board 13, the radio frequency signal element 14 interacts with the writing pen through the communication serial port and the radio frequency module 31 and acquires pressure sensing value information, at the same time, a processing unit of the circuit board 13 will upload coordinate information and pressure sensing information of a touch object to a PC and an Android system when the touch object touches.

A user can use the writing pen 3 to perform an operation on the display screen of the electronic device, then, the radio frequency module 31 on the writing pen 3 emits the radio frequency signal including the pressure value information to the radio frequency signal element 14, and the radio frequency signal element 14 forwards the received radio frequency signal to the circuit board 13; at the same time, the infrared receiver of the infrared light element 131 transmits the infrared detection information to the circuit board 13 after acquiring the infrared detection information; and the processing unit on the circuit board 13 analyzes the infrared detection information and the radio frequency signal to obtain the current touch information of the writing pen, wherein the touch information includes a touch position and a touch pressure of the writing pen, the touch position is a specific coordinate position of the pen point of the writing pen on the display screen, and the touch pressure is a pressure value of the pen point of the writing pen. After receiving the touch information inputted by the circuit board 13, a mainboard can adjust a display content in the display screen according to the touch information, or output control information to a display terminal connected to a touch panel so as to adjust a display content in the display terminal according to the control information.

According to the electronic device and the infrared touch frame having the radio frequency signal processing function provided in the embodiments of the present application, the accommodation space is formed at least by the infrared touch frame; the circuit board, the infrared light element, and the radio frequency signal element are provided in the accommodation space; the circuit board is electrically connected to the infrared light element and the radio frequency signal element, respectively; the side, close to the display device main body, of the infrared touch frame is provided with the filter strip; and the infrared signal of the infrared light element and the radio frequency signal of the radio frequency signal element both penetrate through the filter strip for transmission. According to the above-mentioned infrared touch frame, the radio frequency signal element is integrated in the infrared touch frame, and both the infrared signal and the radio frequency signal penetrate through the filter strip for transmission, so that the external space of the device can be saved, the loss of a receiver is avoided, and it is convenient for a user to use; moreover, the radio frequency signal directly penetrates through the filter strip, so that the transmission efficiency of the radio frequency signal can be improved.

The above descriptions are only specific implementations of the present application, but the protection scope of the present application is not limited thereto. All equivalent modifications or substitutions can be easily conceived by those skilled in the art within the technical scope disclosed by the present application, and these modifications or substitutions shall fall within the protection scope of the present application. Therefore, the protection scope of the present application should be subject to the protection scope defined in the claims.

The invention claimed is:

1. An infrared touch frame having a radio frequency signal processing function, the infrared touch frame being provided on edges of a display device main body, wherein a side, close to the display device main body, of the infrared touch frame is provided with a filter strip;

an accommodation space is formed at least by the infrared touch frame;

a circuit board, an infrared light element, and a radio frequency signal element are provided in the accommodation space; the circuit board is electrically connected to the infrared light element and the radio frequency signal element, respectively; and an infrared signal of the infrared light element and a radio frequency signal of the radio frequency signal element both penetrate through the filter strip for transmission.

2. The infrared touch frame having the radio frequency signal processing function of claim 1, wherein transformation information of the radio frequency signal comprises pressure sensing information.

3. An electronic device, a user using a writing pen to perform an operation on a display screen of the electronic device, wherein the electronic device comprises a display device main body and the infrared touch frame having the radio frequency signal processing function of claim 2;

the infrared light element detects infrared detection information that the writing pen blocks an infrared signal to obtain the infrared detection information and transmit the infrared detection information to the circuit board; and the writing pen communicates with the radio frequency signal element through a radio frequency signal.

4. The electronic device of claim 3, wherein the circuit board acquires the current touch information of the writing pen in real time according to the infrared detection information and the radio frequency signal, wherein the touch information comprises a touch position and a touch pressure of the writing pen.

5. The infrared touch frame having the radio frequency signal processing function of claim 1, wherein the radio frequency signal element comprises a radio frequency IC (Integrated Circuit) and a radio frequency antenna, and the radio frequency antenna is provided on an edge of the filter strip.

6. The infrared touch frame having the radio frequency signal processing function of claim 3, wherein the radio frequency signal element further comprises a power increase module; and the radio frequency IC is connected to the radio frequency antenna through the power increase module.

7. An electronic device, a user using a writing pen to perform an operation on a display screen of the electronic device, wherein the electronic device comprises a display device main body and the infrared touch frame having the radio frequency signal processing function of claim 4;

the infrared light element detects infrared detection information that the writing pen blocks an infrared signal to obtain the infrared detection information and transmit the infrared detection information to the circuit board; and the writing pen communicates with the radio frequency signal element through a radio frequency signal.

8. The electronic device of claim 7, wherein the circuit board acquires the current touch information of the writing pen in real time according to the infrared detection information and the radio frequency signal, wherein the touch information comprises a touch position and a touch pressure of the writing pen.

9. An electronic device, a user using a writing pen to perform an operation on a display screen of the electronic device, wherein the electronic device comprises a display device main body and the infrared touch frame having the radio frequency signal processing function of claim 5;

the infrared light element detects infrared detection information that the writing pen blocks an infrared signal to obtain the infrared detection information and transmit the infrared detection information to the circuit board; and the writing pen communicates with the radio frequency signal element through a radio frequency signal.

10. The electronic device of claim 9, wherein the circuit board acquires the current touch information of the writing pen in real time according to the infrared detection information and the radio frequency signal, wherein the touch information comprises a touch position and a touch pressure of the writing pen.

11. The infrared touch frame having the radio frequency signal processing function of claim 1, wherein the radio frequency signal element is independently provided outside the circuit board and is electrically connected to a component on the circuit board through an external wire.

12. An electronic device, a user using a writing pen to perform an operation on a display screen of the electronic device, wherein the electronic device comprises a display device main body and the infrared touch frame having the radio frequency signal processing function of claim 11;

the infrared light element detects infrared detection information that the writing pen blocks an infrared signal to obtain the infrared detection information and transmit the infrared detection information to the circuit board; and the writing pen communicates with the radio frequency signal element through a radio frequency signal.

13. The electronic device of claim 12, wherein the circuit board acquires the current touch information of the writing pen in real time according to the infrared detection information and the radio frequency signal, wherein the touch information comprises a touch position and a touch pressure of the writing pen.

14. The infrared touch frame having the radio frequency signal processing function of claim 1, wherein the radio frequency signal element is integrated on the circuit board and is electrically connected to a component on the circuit board through a conducting wire on the circuit board.

15. An electronic device, a user using a writing pen to perform an operation on a display screen of the electronic device, wherein the electronic device comprises a display device main body and the infrared touch frame having the radio frequency signal processing function of claim 14;

the infrared light element detects infrared detection information that the writing pen blocks an infrared signal to obtain the infrared detection information and transmit the infrared detection information to the circuit board; and the writing pen communicates with the radio frequency signal element through a radio frequency signal.

16. The electronic device of claim 15, wherein the circuit board acquires the current touch information of the writing pen in real time according to the infrared detection information and the radio frequency signal, wherein the touch information comprises a touch position and a touch pressure of the writing pen.

17. The infrared touch frame having the radio frequency signal processing function of claim 1, wherein the circuit board is parallel to a display screen of the display device main body.

18. The infrared touch frame having the radio frequency signal processing function of claim 1, wherein the circuit board is vertical to a display screen of the display device main body.

19. An electronic device, a user using a writing pen to perform an operation on a display screen of the electronic device, wherein the electronic device comprises a display device main body and the infrared touch frame having the radio frequency signal processing function of claim 1;

the infrared light element detects infrared detection information that the writing pen blocks an infrared signal to obtain the infrared detection information and transmit the infrared detection information to the circuit board; and the writing pen communicates with the radio frequency signal element through a radio frequency signal.

20. The electronic device of claim 19, wherein the circuit board acquires the current touch information of the writing pen in real time according to the infrared detection information and the radio frequency signal, wherein the touch information comprises a touch position and a touch pressure of the writing pen.

* * * * *